United States Patent
Kamijo et al.

(10) Patent No.: US 12,331,466 B2
(45) Date of Patent: Jun. 17, 2025

(54) WATER- AND OIL-PROOFING COMPOSITION, METHOD FOR ITS PRODUCTION, ARTICLE AND WATER- AND OIL-PROOF PAPER

(71) Applicant: AGC Inc., Tokyo (JP)

(72) Inventors: Yuzuka Kamijo, Tokyo (JP); Hiroyuki Hara, Tokyo (JP)

(73) Assignee: AGC Inc., Tokyo (JP)

( * ) Notice: Subject to any disclaimer, the term of this patent is extended or adjusted under 35 U.S.C. 154(b) by 233 days.

(21) Appl. No.: 18/048,105

(22) Filed: Oct. 20, 2022

(65) Prior Publication Data

US 2023/0062674 A1 Mar. 2, 2023

Related U.S. Application Data

(63) Continuation of application No. PCT/JP2021/018860, filed on May 18, 2021.

(30) Foreign Application Priority Data

May 20, 2020 (JP) ................. 2020-088235

(51) Int. Cl.
*D21H 19/12* (2006.01)
*C08J 7/04* (2020.01)
*C09D 151/00* (2006.01)
*D21H 21/16* (2006.01)

(52) U.S. Cl.
CPC ............ *D21H 19/12* (2013.01); *C08J 7/0427* (2020.01); *C09D 151/003* (2013.01); *D21H 21/16* (2013.01); *C08J 2301/00* (2013.01); *C08J 2351/00* (2013.01); *C08J 2401/00* (2013.01); *C08J 2451/00* (2013.01)

(58) Field of Classification Search
CPC ............... C08J 7/0427; C08J 2351/00; C08J 2451/00; C09D 151/003; D21H 21/16; D21H 19/12
See application file for complete search history.

(56) References Cited

U.S. PATENT DOCUMENTS

| 2011/0071248 A1 | 3/2011 | Sugiyama et al. |
| 2011/0077349 A1 | 3/2011 | Hoshino |
| 2011/0196067 A1* | 8/2011 | Otozawa ............ D06M 15/256 524/544 |
| 2014/0051805 A1 | 2/2014 | Shimada et al. |

FOREIGN PATENT DOCUMENTS

| EP | 2 057 201 B1 | 12/2009 |
| JP | 5-331019 A | 12/1993 |
| JP | 7-133325 A | 5/1995 |
| JP | 9-143877 A | 6/1997 |
| JP | 11-181413 A | 7/1999 |
| JP | 2017-160433 A | 9/2017 |
| WO | WO 2009/148029 A1 | 12/2009 |
| WO | WO 2009/148098 A1 | 12/2009 |
| WO | WO 2012/147700 A1 | 11/2012 |
| WO | WO 2019/138680 A1 | 7/2019 |

OTHER PUBLICATIONS

English machine translation of JP 07-133325A. (Year: 1995).*
International Search Report issued Aug. 3, 2021 in PCT/JP2021/018860 filed on May 18, 2021, 3 pages.

* cited by examiner

*Primary Examiner* — John E Uselding
(74) *Attorney, Agent, or Firm* — Oblon, McClelland, Maier & Neustadt, L.L.P.

(57) ABSTRACT

A water- and oil-proofing composition which can provide an article with high utility oil resistance is provided. A water- and oil-proofing composition comprising a fluorinated polymer comprising units based on the following monomer (a) and units based on the following monomer (b), a fatty acid ester of polyglycerin and an aqueous medium: Monomer (a): a compound represented by $CH_2=CH-R^f$ (wherein $R^f$ is a $C_{1-8}$ perfluoroalkyl group). Monomer (b): a monomer copolymerizable with the monomer (a).

14 Claims, No Drawings

WATER- AND OIL-PROOFING COMPOSITION, METHOD FOR ITS PRODUCTION, ARTICLE AND WATER- AND OIL-PROOF PAPER

TECHNICAL FIELD

The present invention relates to a water- and oil-proofing composition, a method for its production, an article and water- and oil-proof paper

BACKGROUND ART

Some water- and oil-proofing compositions are known to impart water and oil resistance to substrates such as paper. Water- and oil-proof paper can be obtained by treating pulp or paper with water- and oil-proofing compositions. Water- and oil-proofing compositions are used in treatment of pulp or paper, for example, by impregnating paper with a water- and oil-proofing composition (external addition), or by forming a pulp slurry containing a water- and oil-proofing composition into paper sheet (internal addition).

Water- and oil-proofing compositions comprising a fluorinated polymer comprising units based on a (meth)acrylate having a perfluoroalkyl group are known. However, the ester linkage in units based on the (meth)acrylate easily breaks upon alkaline hydrolysis. Therefore, the water and oil resistance can wane as the fluorinated polymer loses perfluoroalkyl groups that way.

Among fluorinated polymers comprising no units based on a (meth)acrylate having a perfluoroalkyl group, those comprising units based on a (perfluoroalkyl)ethylene are known.

Patent Document 1 discloses a dispersion comprising a fluorinated polymer comprising units based on a (perfluoroalkyl)ethylene and an aqueous medium. The document specifically discloses copolymerization of a (perfluoroalkyl)ethylene with vinyl acetate, vinyl stearate, vinyl pivalate and the like in the Examples.

PRIOR ART DOCUMENTS

Patent Documents

Patent Document 1: WO2019/138680

DISCLOSURE OF INVENTION

Technical Problem

According to studies by the present inventors, when a pulp or paper is treated with the dispersion disclosed in Patent Document 1, water- and oil-proof paper with alkali-resistant water and oil resistance is obtained. However, the water- and oil-proof paper sometimes does not have sufficient oil resistance under conditions of practical use (hereinafter referred to as "utility oil resistance").

The present invention provides a water- and oil-proofing composition which can provide an article with excellent utility oil resistance, a method for its production, an article with excellent utility oil resistance and water- and oil-proof paper.

Solution to Problem

The present invention provides the following aspects.
[1] A water- and oil-proofing composition comprising a fluorinated polymer comprising units based on the following monomer (a) and units based on the following monomer (b), a fatty acid ester of polyglycerin and an aqueous medium:
monomer (a): a compound represented by the following formula (1)

$$CH_2=CH-R^f \quad (1)$$

wherein $R^f$ is a $C_{1-8}$ perfluoroalkyl group,
monomer (b): a monomer copolymerizable with the monomer (a).
[2] The water- and oil-proofing composition according to [1], wherein the content of the fatty acid ester of polyglycerin is from 2 to 8 parts by mass, per 100 parts by mass of the fluorinated polymer.
[3] The water- and oil-proofing composition according to [1] or [2], wherein the fatty acid ester of polyglycerin has an HLB of from 10 to 18.
[4] The water- and oil-proofing composition according to any one of [1] to [3], wherein the ratio of units based on the monomer (a) to all the units constituting the fluorinated polymer is from 15 to 40 mol %.
[5] The water- and oil-proofing composition according to any one of [1] to [4], wherein the monomer (b) comprises the following monomer (b1):
monomer (b1): a compound having a molecular weight of from 45 to 350 represented by the following formula (2) or the following formula (3):

$$CH_2=CH-Q \quad (2)$$

$$CH_2=CHCH_2-Q \quad (3)$$

wherein Q is a halogen atom or an organic group having an oxygen atom, a nitrogen atom or a sulfur atom at the bonding end.
[6] The water- and oil-proofing composition according to [5], wherein Q in the formula (2) and the formula (3) is a fluorine atom, a chlorine atom, $-OR^4$, $-OC(=O)R^4$, $-NHR^4$, $-NR^4R^5$, $-SR^4$ or a nitrogen-containing heterocyclic group which has a ring-constituting nitrogen atom at the bonding end:
(wherein each of $R^4$ and $R^5$ is independently a $C_{1-22}$ alkyl group, a cycloalkyl group containing from 3 to 8 ring-constituting carbon atoms, an aryl group or a heterocyclic group).
[7] The water- and oil-proofing composition according to [5] or [6], wherein the monomer (b1) is a vinyl carboxylate, an allyl carboxylate, an alkyl vinyl ether, an alkyl allyl ether, a hydroxyalkyl vinyl ether, a hydroxyalkyl allyl ether, a vinyl halide or an allyl halide.
[8] The water- and oil-proofing composition according to any one of [5] to [7], wherein the ratio of units based on the monomer (b1) to all the units constituting the fluorinated polymer is from 60 to 85 mol %.
[9] The water- and oil-proofing composition according to any one of [1] to [8], wherein $R^f$ in the formula (1) is a $C_{1-6}$ perfluoroalkyl group.
[10] A method for producing a water- and oil-proofing composition, which comprises polymerizing a monomer component in an emulsion comprising the monomer component, a fatty acid ester of polyglycerin, an aqueous medium and a polymerization initiator, wherein the monomer component comprises the following monomer (a) and the following monomer (b):
monomer (a): a compound represented by the following formula (1)

$$CH_2=CH-R^f \quad (1)$$

wherein $R^f$ is a $C_{1-8}$ perfluoroalkyl group,
monomer (b): a monomer copolymerizable with the monomer (a).

[11] The method for producing a water- and oil-proofing composition according to [10], wherein the content of the fatty acid ester of polyglycerin is from 2 to 8 parts by mass per 100 parts by mass of the monomer component.

[12] The method for producing a water- and oil-proofing composition according to [10] or [11], wherein the ratio of the monomer (a) to the monomer component is from 15 to 40 mol %.

[13] An article obtained by treatment with the water- and oil-proofing composition as defined in any one of [1] to [9].

[14] Water- and oil-proof paper obtained by treating a pulp or paper with the water- and oil-proofing composition as defined in any one of [1] to [9].

Advantageous Effects of Invention

The water- and oil-proofing composition of the present invention can provide an article with excellent utility oil resistance.

The method for producing a water- and oil-proofing composition of the present invention can produce a water- and oil-proofing composition which can provide an article with excellent utility oil resistance.

The article and water- and oil-proof paper of the present invention have excellent utility oil resistance.

DESCRIPTION OF EMBODIMENTS

The terms used in the present invention have the following meanings and definitions.

A "unit based on a monomer" is a generic term for an atomic group derived from 1 molecule of the monomer by polymerization directly, or by polymerization and subsequent partial chemical modification.

A "(meth)acrylate" is a generic term for an acrylate and a methacrylate. Similarly, "(meth)acryloyl" is a generic term for acryloyl and methacryloyl.

The number average molecular weight (hereinafter referred to as "Mn") of a polymer is polymethyl methacrylate equivalent molecular weights measured by gel permeation chromatography (hereinafter referred to as "GPC") from a calibration curve obtained using polymethyl methacrylate standards.

A solid content is calculated as (solid mass/sample mass)× 100, wherein the sample mass is the mass of a sample before heating, and the solid mass is the mass of the sample after 4 hours of heating at 120° C. in a convection dryer.

[Water- and Oil-Proofing Composition]

The water- and oil-proofing composition of the present invention (hereinafter referred to as "the present composition") comprises a specific fluorinated polymer (hereinafter referred to as "polymer A"), a fatty acid ester of polyglycerin and an aqueous medium.

The polymer A is preferably in the form of emulsion particles dispersed in an aqueous medium.

The present composition may comprise a medium other than the aqueous medium, if necessary.

The present composition may comprise an additional surfactant other than the fatty acid ester of polyglycerin, if necessary.

The present composition may comprise additional components, if necessary.

The present composition means both a dispersion (hereinafter referred to as "dispersion (D1)") obtained by polymerizing a monomer component in an emulsion comprising the monomer component, a fatty acid ester of polyglycerin, an aqueous medium and a polymerization initiator according to the method of the present invention for producing a water- and oil-proofing composition, which will be described later, and a dispersion (hereinafter referred to as "dispersion (D2)") obtained by diluting the dispersion (D1) with any aqueous medium before treatment of a substrate.

(Polymer A)

The polymer A comprises units (hereinafter referred to as "units (a)") based on a monomer (a) and units (hereinafter referred to as "units (b)") based on a monomer (b):
monomer (a): a compound represented by the following formula (1)

$$CH_2=CH-R^f \quad (1)$$

wherein $R^f$ is a $C_{1-8}$ perfluoroalkyl group,
monomer (b): a monomer copolymerizable with the monomer (a).

$R^f$ in the monomer (a) preferably has from 1 to 6 carbon atoms, more preferably from 4 to 6 carbon atoms, particularly preferably 6 carbon atoms, in view of high conversion rate to the polymer A, availability of the raw materials and ease of handling.

$R^f$ is preferably linear.

As the monomer (a), for example, $CH_2=CH-CF_3$, $CH_2=CH-CF_2CF_3$, $CH_2=CH-CF_2CF_2CF_3$, $CH_2=CH-CF(CF_3)_2$, $CH_2=CH-(CF_2)_3CF_3$, $CH_2=CH-CF_2CF(CF_3)_2$, $CH_2=CH-C(CF_3)_3$, $CH_2=CH-(CF_2)_4CF_3$, $CH_2=CH-CF_2CF_2CF(CF_3)_2$, $CH_2=CH-(CF_2)_5CF_3$, $CH_2=CH-(CF_2)_5CF(CF_3)_2$ and $CH_2=CH-(CF_2)_7CF_3$ may be mentioned.

As the monomer (a), $CH_2=CH-CF_3$, $CH_2=CH-CF_2CF_3$, $CH_2=CH-CF(CF_3)_2$, $CH_2=CH-(CF_2)_3CF_3$ and $CH_2=CH-(CF_2)_5CF_3$ are preferred, $CH_2=CH-CF_3$, $CH_2=CH-CF_2CF_3$, $CH_2=CH-(CF_2)_3CF_3$ and $CH_2=CH-(CF_2)_5CF_3$ are more preferred, and $CH_2=CH-(CF_2)_3CF_3$ and $CH_2=CH-(CF_2)_5CF_3$ are further preferred.

Two or more monomers (a) may be used in combination.

The monomer (b) may be any monomer as long as it is copolymerizable with the monomer (a). For easy copolymerization with the monomer (a), it is preferred that the monomer (b) comprises a monomer (b1).

Monomer (b1): a compound having a molecular weight of from 45 to 350 represented by the following formula (2) or the following formula (3):

$$CH_2=CH-Q \quad (2)$$

$$CH_2=CHCH_2-Q \quad (3)$$

wherein Q is a halogen atom or an organic group having an oxygen atom, a nitrogen atom or a sulfur atom at the bonding end.

The molecular weight of the monomer (b1) is preferably from 50 to 300, more preferably from 55 to 150 so that functional groups sufficient to improve adhesion to a substrate are introduced in the polymer without decreasing the mass ratio of the monomer (a) too much to maintain oil resistance.

The organic group having an oxygen atom, a nitrogen atom or a sulfur atom at the bonding end may, for example, be —$OR^4$, —$OC(=O)R^4$, —$NHR^4$, —$NR^4R^5$, —$SR^4$ or a nitrogen-containing heterocyclic group containing a ring-constituting nitrogen atom at the bonding end. Herein, each of $R^4$ and $R^5$ is independently an alkyl group, a cycloalkyl group, an aryl group or a heterocyclic group. The number of carbon atoms in the alkyl group is, for example, from 1 to 22. The number of ring-constituting carbon atoms in the cycloalkyl group is, for example, from 3 to 8.

The organic group as Q may have a reactive group such as a hydroxy group, a carboxy group, an amino group or an alkylamino group or a halogen atom and may have a linking group such as an etheric oxygen atom, a carbonyloxy group or a carbonyl group other than at the bonding end. It may also have a polymerizable carbon-carbon double bond. The reactive group is preferably a hydroxy group. The organic group as Q preferably has no polymerizable carbon-carbon double bond.

Q is preferably a halogen atom, —$OR^4$ or —$OC(=O)R^4$, more preferably a fluorine atom, a chlorine atom or —$OC(=O)R^4$ wherein $R^4$ is the same as defined above, in view of copolymerizability with the monomer (a) and adhesion to a substrate.

The compound represented by the formula (2) is preferably a vinyl carboxylate, a vinyl ether or a vinyl halide. The vinyl ether is preferably an alkyl vinyl ether or a hydroxyalkyl vinyl ether.

The compound represented by the formula (3) is preferably an allyl carboxylate, an allyl ether or an allyl halide. The allyl ether is preferably an alkyl allyl ether or a hydroxyalkyl allyl ether.

The acyl group in the vinyl carboxylate or the allyl carboxylate preferably has at most 24 carbon atoms, more preferably from 2 to 6 carbon atoms. It is also preferred to use a vinyl or allyl carboxylate having a $C_{2-6}$ acyl group and a vinyl or allyl carboxylate having a $C_{10-22}$ acyl group in combination.

The alkyl or hydroxyalkyl in the alkyl vinyl ether, the hydroxyalkyl vinyl ether, the alkyl allyl ether and the hydroxyalkyl allyl ether preferably has from 2 to 6 carbon atoms.

The vinyl carboxylate may, for example, be vinyl acetate, vinyl butyrate, vinyl pivalate, vinyl caproate, vinyl caprylate, vinyl laurate, vinyl stearate, vinyl benzoate, vinyl chloroacetate or divinyl adipate. The vinyl carboxylate is preferably vinyl acetate in view of production of an article with good oil resistance.

The vinyl ether may, for example, methyl vinyl ether, ethyl vinyl ether, n-butyl vinyl ether, iso-butyl vinyl ether, tert-butyl vinyl ether, 2-hydroxyethyl vinyl ether, 4-hydroxybutyl vinyl ether, stearyl vinyl ether, chloromethyl vinyl ether, 2-chloroethyl vinyl ether, chloropropyl vinyl ether, cyclohexyl vinyl ether, ethylene glycol monovinyl ether or diethylene glycol monovinyl ether.

The allyl carboxylate may, for example, be allyl acetate or diallyl adipate.

The allyl ether may, for example, be allyl ethyl ether, diallyl ether, 1,3-diallyloxy-2-propanol or ethylene glycol monoallyl ether.

The vinyl halide may, for example, be vinyl chloride or vinyl fluoride.

The allyl halide may, for example, be allyl chloride or allyl fluoride.

Other examples of the compound represented by the formula (2) or (3) include N-vinylpyrrolidone, N-vinyl-ε-caprolactam and ethyl vinyl sulfide.

The monomer (b1) is preferably a vinyl carboxylate, an allyl carboxylate, an alkyl vinyl ether, an alkyl allyl ether, a hydroxyalkyl vinyl ether, a hydroxyalkyl allyl ether, a vinyl halide or an allyl halide, more preferably a vinyl carboxylate or a vinyl halide, for its copolymerizability with the monomer (a) and production of an article with high oil resistance.

Specifically speaking, the monomer (b1) is preferably vinyl acetate, vinyl butyrate, vinyl pivalate, vinyl caprylate, vinyl laurate, vinyl stearate, vinyl benzoate, vinyl chloroacetate, ethyl vinyl ether, tert-butyl vinyl ether, 4-hydroxybutyl vinyl ether, ethylene glycol monoallyl ether, vinyl chloride or vinyl fluoride, more preferably vinyl acetate, in view of production of an article with high oil resistance.

The polymer A may comprise units based on a monomer (b) other than the monomer (b1) (hereinafter referred to as "monomer (b2)"), as units (b).

The monomer (b2) may, for example, be an olefin, a haloolefin other than vinyl halides, an alkyl (meth)acrylate, a hydroxyalkyl (meth)acrylate, a fluoroalkyl (meth)acrylate or a perfluoro(alkyl vinyl ether). Specifically speaking, it may be ethylene, propylene, vinylidene chloride, vinylidene fluoride, trifluoroethylene, chlorotrifluoroethylene, hexafluoropropylene, tetrafluoroethylene, methyl (meth)acrylate, ethyl (meth)acrylate, stearyl (meth)acrylate, behenyl (meth)acrylate, isobornyl (meth)acrylate, 2-hydroxyethyl (meth)acrylate, 2-[(3,5-dimethylpyrazolyl)carbonylamino]ethyl (meth)acrylate, N-methylolacrylamide, 2-perfluorohexylethyl (meth)acrylate, $CF_2=CFOCF_3$, $CF_2=CFOCF_2CF_3$, $CF_2=CFOCF_2CF_2CF_3$, $CF_2=CFOCF_2CF_2CF_2CF_3$ or $CF_2=CFOCF_2CF(CF_3)OCF_2CF_2CF_3$.

The monomer (b2) is preferably a (meth)acrylate. However, the polymer A is preferred to comprise no units based on a (meth)acrylate having a perfluoroalkyl group, in view of production of an article with more alkali-resistant water and oil resistance. Therefore, as the monomer (b2), preferred is a fluorine-free (meth)acrylate such as methyl (meth)acrylate, n-butyl (meth)acrylate, tert-butyl (meth)acrylate, 2-hydroxyethyl (meth)acrylate, lauryl (meth)acrylate, stearyl (meth)acrylate or behenyl (meth)acrylate. n-Butyl (meth)acrylate and 2-hydroxyethyl (meth)acrylate are preferred for production of a polymer A with a low glass transition temperature having good film-forming properties, and lauryl (meth)acrylate, stearyl (meth)acrylate and behenyl (meth)acrylate are preferred for production of an article with high water resistance.

The polymer A is preferably a polymer comprising units based on the monomer (b1) as units (b), such as a polymer comprising units based on a monomer (b1) only as units (b) or a polymer comprising units based on a monomer (b1) and units based on a monomer (b2) as units (b).

The polymer A may comprise units based on two or more monomers (b1). When the polymer A comprises units based on a monomer (b2), it may comprise units based on two or more monomers (b2).

The ratio of units (a) to all the units constituting the polymer A (namely, the sum of units (a) and units (b)) is preferably from 15 to 40 mol %, more preferably from 20 to 38 mol %, further preferably from 25 to 35 mol %. When the ratio of units (a) is not lower than the above-mentioned lower limit, the present composition can provide an article with higher water and oil resistance. When the ratio of units (a) is not higher than the above-mentioned upper limit, the conversion rate to the polymer A during the polymerization tends to be high.

When units (b) comprise units based on a monomer (b1), the ratio of units based on the monomer (b1) to all the units constituting the polymer A is preferably from 60 to 85 mol %, more preferably from 62 to 80 mol %, further preferably from 65 to 75 mol %. When the ratio of units based on a monomer (b1) is not lower than the above-mentioned lower limit, the conversion rate to the polymer A during the polymerization tends to be high. When the ratio of units based on a monomer (b1) is not higher than the above-mentioned upper limit, the present composition can provide an article with higher water and oil resistance.

The ratio of units based on a monomer (b2) to all the units constituting the polymer A is preferably at most 25 mass %, more preferably at most 12 mass %, further preferably at most 10 mass % and may be 0 mass %. When the ratio of units (b2) is not higher than the above-mentioned upper limit, an article with alkali-resistant water and oil resistance is provided.

The ratios of the respective units can be determined by $^1$H-NMR or calculated from the reaction ratios of the respective monomers measured by gas chromatography. When the conversion rate of the monomer component to the polymer A during production of the polymer A is high (for example, at least 90%), the ratios of the respective units may be calculated from the feed amount of the monomer component.

The conversion rate is calculated from the theoretical mass of a polymer A calculated from the amounts of the raw materials used and the actual mass of the polymer A, as the actual mass/theoretical mass×100.

The Mn of the polymer A is preferably at least 10,000, more preferably at least 11,000, further preferably at least 12,000. The Mn of the polymer A is preferably at most 100,000, more preferably at most 70,000, further preferably at most 50,000. When the Mn of the polymer A is not lower than the above-mentioned lower limit, the present composition can provide an article with higher water and oil resistance. When the Mn of the polymer A is not higher than the above-mentioned upper limit, the polymer A is more dispersible in water.

(Fatty Acid Ester of Polyglycerin)

A fatty acid ester of polyglycerin improves utility oil resistance of the present composition and stabilizes dispersion of the polymer A in the present composition.

A fatty acid ester of polyglycerin is an ester of a fatty acid with polyglycerin.

The average degree of polymerization of the polyglycerin is preferably from 6 to 15, more preferably from 8 to 12. When the average degree of polymerization is within the above-mentioned range, a fatty acid ester of the polyglycerin tends to have an HLB within a preferred range, which will be described later.

Examples of the polyglycerin include tetraglycerin (average degree of polymerization 4), hexaglycerin (average degree of polymerization 6) and decaglycerin (average degree of polymerization 10).

The average degree of polymerization is calculated from the hydroxy value (mgKOH/g) in accordance with JIS K 1557-1:2009 by the formula $\{(2\times A-18.0)/(74.1-A)\}$ wherein $56.1\times1000$/hydroxy value=A.

The fatty acid may be a saturated fatty acid or an unsaturated fatty acid and may be linear or branched.

The number of carbon atoms in the fatty acid is preferably from 6 to 22, more preferably from 8 to 18. When the number of carbon atoms in the fatty acid is within the above-mentioned range, the fatty acid ester of polyglycerin tends to have an HLB within a preferred range, which will be described later.

The fatty acid ester of polyglycerin preferably contains polyglycerin and a fatty acid in a molar ratio (fatty acid:polyglycerin) of from 15:1 to 2:1, more preferably from 12:1 to 8:1. When it contains from 8 to 12 moles of a polyglycerin per 1 mole of the fatty acid, it tends to have an HLB within a preferred range, which will be described later.

Examples of the fatty acid ester of polyglycerin include tetraglyceryl dilaurate, tetraglyceryl dimyristate, tetraglyceryl dipalmitate, tetraglyceryl distearate, tetraglyceryl dibehenate, tetraglyceryl trilaurate, tetraglyceryl trimyristate, tetraglyceryl tripalmitate, tetraglyceryl tristearate, tetraglyceryl tribehenate, tetraglyceryl tetralaurate, tetraglyceryl tetramyristate, tetraglyceryl tetrapalmitate, tetraglyceryl tetrastearate, tetraglyceryl tetrabehenate, hexaglyceryl dilaurate, hexaglyceryl dimyristate, hexaglyceryl dipalmitate, hexaglyceryl distearate, hexaglyceryl dibehenate, hexaglyceryl trilaurate, hexaglyceryl trimyristate, hexaglyceryl tripalmitate, hexaglyceryl tristearate, hexaglyceryl tribehenate, hexaglyceryl tetralaurate, hexaglyceryl tetramyristate, hexaglyceryl tetrapalmitate, hexaglyceryl tetrastearate, hexaglyceryl tetrabehenate, hexaglyceryl pentalaurate, hexaglyceryl pentamyristate, hexaglyceryl pentapalmitate, hexaglyceryl pentastearate, hexaglyceryl pentabehenate, decaglyceryl monolaurate, decaglyceryl monomyristate, decaglyceryl monopalmitate, decaglyceryl monostearate, decaglyceryl monobehenate, decaglyceryl dilaurate, decaglyceryl dimyristate, decaglyceryl dipalmitate, decaglyceryl distearate, decaglyceryl dibehenate, decaglyceryl trilaurate, decaglyceryl trimyristate, decaglyceryl tripalmitate, decaglyceryl tristearate, decaglyceryl tribehenate, decaglyceryl tetralaurate, decaglyceryl tetramyristate, decaglyceryl tetrapalmitate, decaglyceryl tetrastearate, decaglyceryl tetrabehenate, decaglyceryl pentalaurate, decaglyceryl pentamyristate, decaglyceryl pentapalmitate, decaglyceryl pentastearate, decaglyceryl pentabehenate, decaglyceryl heptalaurate, decaglyceryl heptamyristate, decaglyceryl heptapalmitate, decaglyceryl heptastearate, decaglyceryl heptabehenate, decaglyceryl octalaurate, decaglyceryl octamyristate, decaglyceryl octapalmitate, decaglyceryl octastearate and decaglyceryl octabehenate. Decaglyceryl monolaurate and decaglyceryl monostearate are more preferred to produce an article with higher utility oil resistance and to disperse the polymer A in the present composition more stably.

Two or more fatty acid esters of polyglycerin may be used.

The HLB of the fatty acid ester of polyglycerin is preferably from 10 to 18, more preferably from 12 to 17. When the HLB of the fatty acid ester of polyglycerin is within the above-mentioned range, the present composition can provide an article with high utility oil resistance, and the polymer A can be dispersed more stably in the present composition.

HLB is measured by Griffin's method.

(Aqueous Medium)

As the aqueous medium, water or water containing a water-miscible organic solvent may be mentioned.

A water-miscible organic solvent is an organic solvent which can be mixed with water in any ratio. The water-miscible organic solvent is preferably at least one species selected from the group consisting of alcohols (other than ether alcohols), ether alcohols, polyglycerins and aprotic polar solvents.

As the alcohols, t-butanol and propylene glycol may, for example, be mentioned. As the ether alcohols, 3-methoxymethylbutanol, dipropylene glycol, dipropylene glycol monomethyl ether and tripropylene glycol may, for example, be mentioned. As the polyglycerins, those mentioned as the polyglycerin in the fatty acid ester of polyglycerin may, for example, be mentioned. As the aprotic polar solvents, N,N-dimethylformamide, dimethyl sulfoxide, tetrahydrofuran (hereinafter referred to as "THF"), acetonitrile, acetone, 3-methoxy-N,N-dimethylpropanamide, 3-butoxy-N,N-dimethylpropanamide, 3-methoxy-3-methyl-1-butanol, triethylene glycol dimethyl ether and tetraethylene glycol dimethyl ether may, for example, be mentioned.

The water-miscible organic solvent in the aqueous medium is preferably an ether alcohol, more preferably dipropylene glycol, tripropylene glycol or dipropylene glycol monomethyl ether, because the resulting aqueous medium shows high compatibility with the polymer A and thereby facilitates formation of a uniform coating on an article.

When the aqueous medium is water containing a water-miscible organic solvent, the amount of the water-miscible organic solvent is preferably from 1 to 80 parts by mass, more preferably from 5 to 60 parts by mass, per 100 parts by mass of water.

(Medium Other than Aqueous Medium)

As media other than the aqueous medium, water-immiscible media may be mentioned. As water-immiscible media, glycols, glycol ethers (other than ether alcohols), hydrocarbons, ketones, esters, ethers (other than ether alcohols and glycol ethers) and halogenated compounds may, for example, be mentioned. Such media may be contained in combination of two or more.

As the glycols or glycol ethers, diethylene glycol monobutyl ether acetate, ethylene glycol monoethyl ether acetate, ethylene glycol monobutyl ether acetate, propylene glycol monomethyl ether acetate, propylene glycol dimethyl ether and dipropylene glycol dimethyl ether may, for example, be mentioned.

As hydrocarbons, aliphatic hydrocarbons, alicyclic hydrocarbons and aromatic hydrocarbons may, for example, be mentioned. As aliphatic hydrocarbons, pentane, 2-methylbutane, 3-methylpentane, hexane, 2,2-dimethylbutane, 2,3-dimethylbutane, heptane, octane, 2,2,4-trimethylpentane, 2,2,3-trimethylhexane, decane, undecane, dodecane, 2,2,4,6,6-pentamethylheptane, tridecane, tetradecane and hexadecane may, for example, be mentioned. As alicyclic hydrocarbons, cyclopentane, methylcyclopentane, cyclohexane, methylcyclohexane and ethylcyclohexane may, for example, be mentioned. As aromatic hydrocarbons, benzene, toluene and xylene may, for example, be mentioned.

As ketones, methyl ethyl ketone, 2-pentanone, 3-pentanone, 2-hexanone and methyl isobutyl ketone may, for example, be mentioned.

As esters, methyl acetate, ethyl acetate, butyl acetate and methyl propionate may, for example, be mentioned.

As ethers, diisopropyl ether may, for example, be mentioned.

As halogenated compounds, hydrohalocarbons and halogenated ethers may, for example, be mentioned. As hydrohalocarbons, hydrochlorofluorocarbons, hydrofluorocarbons and hydrobromocarbons may, for example, be mentioned. As halogenated ethers, hydrofluoroethers may, for example, be mentioned. As hydrofluoroethers, segregated hydrofluoroethers and non-segregated hydrofluoroethers may, for example, be mentioned. A segregated hydrofluoroether is a compound having a perfluoroalkyl or perfluoroalkylene group liked to via an etheric oxygen atom to an alkyl or alkylene group. A non-segregated hydrofluoroether is a hydrofluoroether having partially fluorinated alkyl or alkylene groups.

The content of a medium other than aqueous media, if any, is preferably from 0.05 to 20 parts by mass, more preferably from 0.1 to 15 parts by mass, per 100 parts by mass of the polymer A.

(Additional Surfactants)

The additional surfactant is preferably a surfactant having no fluorine atoms.

The additional surfactant may be an anionic surfactant, a nonionic surfactant (other than fatty acid esters of polyglycerins), a cationic surfactant or an amphoteric surfactant.

Examples of nonionic surfactants include surfactants $s^1$ to $s^6$ described in paragraphs [0067] to [0095] of JP-A-2009-215370 (other than fatty acid esters of polyglycerins).

As the surfactant $s^1$, a polyoxyethylene alkyl ether is preferred.

As the surfactant $s^2$, an acetylene glycol ethylene oxide adduct is preferred. As the surfactant $s^3$, a polymerization product of ethylene oxide and propylene oxide is preferred. Two or more nonionic surfactants may be used in combination.

Examples of cationic surfactants include surfactant $s^7$ described in paragraphs [0096] to [0100] of JP-A-2009-215370.

The surfactant $s^7$ is preferably an ammonium salt having at least one alkyl group, alkenyl group or hydroxyl-terminated polyoxyalkylene chain on the nitrogen atom, instead of hydrogen atom(s), and is more preferably a compound ($s^{71}$) represented by the following formula ($s^{71}$).

$$[(R^{21})_4N^+] \cdot X^- \qquad (s^{71})$$

wherein $R^{21}$ is a hydrogen atom, a $C_{1-22}$ alkyl group, a $C_{2-22}$ alkenyl group, a $C_{1-9}$ fluoroalkyl group or a hydroxy-terminated polyoxyalkylene chain, provided that not all of the four $R^{21}$'s, which may be the same or different, are hydrogen atoms, and $X^-$ is a counter ion.

$X^-$ is preferably a chloride ion, an ethyl sulfate ion or an acetate ion.

Examples of the compound ($s^{71}$) include monostearyltrimethylammonium chloride, monostearyldimethylmonoethylammonium ethyl sulfate, mono(stearyl)monomethyldi (polyethylene glycol)ammonium chloride, di(beef tallow alkyl)dimethylammonium chloride and dimethylmonococonutamine acetate.

Two or more cationic surfactants may be used in combination.

Examples of amphoteric surfactants include surfactant $s^8$ described in paragraphs [0101] to [0102] of JP-A-2009-215370. A single species may be used, or two or more species may be used in combination.

(Additional Components)

Additional components may be added to the dispersion (D1) or to the dispersion (D2).

Examples of additional components to be added to the dispersion (D1) include a resin other than the polymer A, glue, a crosslinking agent, a catalyst, an organic filler, an inorganic filler, a supporting agent, a moisturizing agent, a flocculant, a buffer, a bactericide, a biocide, a sequestering agent, a hydrophobizing agent, a surfactant, a defoamer and a volatile organic solvent.

Examples of additional components to be added to the dispersion (D2) include additives to be used in the external addition process described later, such as a paper strength additive (such as starches and resins), a sizing agent, a penetrant, a defoamer, a chelating agent, a dye, a pigment, a binder, an acid, an alkali, an alginate and aluminum sulfate, and additives to be used in the internal addition process described later, such as a coagulant, a retention aid, a sizing agent, a paper strength agent, a pigment, a dye and a pH adjuster.

Two or more additional components may be used.

It is possible to add the same component or different components having the same function as the component added to the dispersion (D1) to the dispersion (D2). Examples of the additional components are not limited to those mentioned above.

Incorporation of a crosslinking agent into the present composition tends to improve the adhesion to a substrate.

The crosslinking agent is preferably an isocyanate crosslinking agent, a methylol crosslinking agent, a carbodiimide crosslinking agent or an oxazoline crosslinking agent.

As the isocyanate crosslinking agents, for example, blocked type aromatic isocyanate crosslinking agents, blocked type aliphatic isocyanate crosslinking agents, non-blocked type aromatic isocyanate crosslinking agents and non-blocked type aliphatic isocyanate crosslinking agents may be mentioned. Isocyanate crosslinking agents which are in the form of an aqueous dispersion containing a surfactant as an emulsifier or inherently water-dispersible isocyanate crosslinking agents having a hydrophilic group are preferred.

As the methylol crosslinking agent, condensates or precondensates of urea or melamine with formaldehyde, methylol-dihydroxyethylene-urea and derivatives thereof, methylol-ethylene-urea, methylol-propylene-urea, methylol-triazone, dicyandiamide-formaldehyde condensates and methylol-carbamate, methylol-(meth)acrylamide, and polymers thereof may, for example, be mentioned.

Carbodiimide crosslinking agents are polymers having a carbodiimide group in the molecule and are highly reactive with carboxy groups, amino groups, active hydrogen groups on a substrate or the like.

Oxazoline crosslinking agents are polymers having an oxazoline group in the molecule and are highly reactive with carboxy groups on a substrate or the like.

As other crosslinking agents, for examples, divinyl sulfone, polyamides and their cationic derivatives, polyamines and their cationic derivatives, epoxy derivatives such as diglycidyl glycerol and halide derivatives such as (epoxy-2,3-propyl)trimethylammonium chloride and N-methyl-N-(epoxy-2,3-propyl)morpholinium chloride, ethylene glycol chloromethyl ether pyridinium salt, polyamine-polyamide-epichlorohydrin resins, polyvinyl alcohol and its derivatives, polyacrylamide and its derivatives, glyoxal resin type anticrease agents may be mentioned.

When the present composition contains a methylol crosslinking agent or a glyoxal resin type anticrease agent, it is preferred to incorporate a catalyst in the composition as an additive. The catalyst may, for example, be an inorganic amine or an organic amine. The inorganic amine may, for example, be ammonium chloride. The organic amine may, for example, be an amino alcohol hydrochloride or semicarbazide hydrochloride. The amino alcohol hydrochloride may, for example, be monoethanolamine hydrochloride, diethanolamine hydrochloride, triethanol hydrochloride or 2-amino-2-methylpropanol hydrochloride.

(Ratios of Respective Components)

The content of the fatty acid ester of polyglycerin is preferably from 1 to 10 parts by mass, more preferably from 2 to 8 parts by mass, further preferably from 4 to 7 parts by mass, per 100 parts by mass of the polymer A. when the content of the fatty acid ester of polyglycerin is within the above-mentioned range, the present composition can provide an article with higher utility oil resistance.

The content of the aqueous medium may be selected appropriately depending on the desired solid content.

The solid content of the present composition in the case of the dispersion (D1) (immediately after production of the composition) is preferably from 20 to 70 mass %, more preferably from 30 to 60 mass %.

The solid content of the present composition in the case of the dispersion (D2) (at the time of treatment of a substrate) is preferably from 0.1 to 7 mass %, more preferably from 0.2 to 5 mass %.

The content of additional surfactants is preferably at most 6 parts by mass, more preferably at most 3 parts by mass, per 100 parts by mass of the polymer A. When the content of surfactants is at the above-mentioned upper limit or below, it is possible to reduce the adverse effect of additional surfactants on the water and oil resistance of an article treated with the present composition.

The content of a crosslinking agent in the present composition is preferably from 1 to 50 parts by mass per 100 parts by mass of the polymer A at the time of treatment of a substrate such as paper.

(Mechanism)

As described above, because the polymer A comprises units (a), the present composition can provide an article (such as water- and oil-proof paper) having alkali-resistant water and oil resistance.

Because the present composition comprises a fatty acid ester of polyglycerin in addition to the polymer A, it can provide an article with high utility oil resistance.

[Method for Producing Water- and Oil-Proofing Composition]

The present composition can be produced, for example, by a method comprising polymerizing a monomer component consisting of a monomer (a) and a monomer (b) in an emulsion comprising a fatty acid ester of polyglycerin, an aqueous medium and a polymerization initiator. According to the method, the polymer A is obtained with a high conversion rate of the monomer component to the polymer A and a high number average molecular weight.

The emulsion may comprise an additional surfactant (other than fatty acid esters of polyglycerin), if necessary.

The ratio of the monomer (a) to the monomer component (namely, the sum of the monomer (a) and the monomer (b)) is preferably from 15 to 40 mol %, more preferably from 20 to 38 mol %, further preferably from 25 to 35 mol %. When the ratio of the monomer (a) is not lower than the above-mentioned lower limit, the present composition can provide an article having higher water and oil resistance. When the ratio of the monomer (a) is not higher than the above-mentioned upper limit, the conversion rate to the polymer A during the polymerization tends to be high.

When the monomer (b) comprises a monomer (b1), the ratio of the monomer (b1) to the monomer component is preferably from 60 to 85 mol %, more preferably from 62 to 80 mol %, further preferably form 65 to 75 mol %. When the ratio of the monomer (b1) is not lower than the above-mentioned lower limit, the conversion rate during the polymerization tends to be high. When the ratio of the monomer (b1) is not higher than the above-mentioned upper limit, the present composition can provide an article having higher water and oil resistance.

The ratio of the monomer (b2) to the monomer component is preferably at most 25 mass %, more preferably at most 12 mass %, further preferably at most 10 mass % and may be 0 mass %. When the ratio of the monomer (b2) is not higher than the above-mentioned upper limit, an article with more alkali-resistant water and oil resistance is provided.

The polymerization initiator may, for example, be a thermal polymerization initiator, a photopolymerization initiator, a radiation polymerization initiator, a radical polymerization initiator or an ionic polymerization initiator, and is preferably a radical polymerization initiator. As the radical polymerization initiator, for example, an azo type polymerization initiator, a peroxide type polymerization initiator or a redox type initiator is employed depending upon the polymerization temperature. As the radical polymerization initiator, preferred is an azo compound, more preferred is a salt of an azo compound. The polymerization temperature is preferably from 20 to 150° C.

The amount of the polymerization initiator is preferably from 0.1 to 5 parts by mass, more preferably from 0.1 to 3 parts by mass, per 100 parts by mass of the monomer component.

At the time of polymerization of a monomer component, a molecular weight-controlling agent may be employed. The molecular weight-controlling agent is preferably an aromatic compound, a mercaptoalcohol, a mercaptocarboxylic acid or an alkyl mercaptan, more preferably a mercaptocarboxylic acid or an alkyl mercaptan. Examples of the molecular weight-controlling agent include mercaptoethanol, mercaptopropionic acid, n-octyl mercaptan, n-dodecyl mercaptan, tert-dodecyl mercaptan, stearyl mercaptan and α-methylstyrene dimer ($CH_2$=$C(Ph)CH_2C(CH_3)_2Ph$ wherein Ph is a phenyl group).

The amount of the molecular weight-controlling agent is preferably at most 5 parts by mass, more preferably at most 2 parts by mass, per 100 parts by mass of the monomer component, and may be 0 part by mass.

The emulsion may be prepared, by emulsifying a mixture comprising an aqueous medium and a monomer component, and, if necessary, a surfactant in a homogenizer, a high-pressure emulsifying machine or the like and adding a polymerization initiator.

The concentration of the monomer component in the emulsion is preferably from 20 to 60 mass %, more preferably from 30 to 50 mass %. When the concentration of the monomer component in the emulsion is within the above-mentioned range, the monomer component polymerizes into a polymer A having a sufficiently high molecular weight with a high conversion rate.

The content of the fatty acid ester of polyglycerin in the emulsion is preferably from 1 to 10 parts by mass, more preferably from 2 to 8 parts by mass, further preferably from 4 to 7 parts by mass, per 100 parts by mass of the monomer component. When the content of the fatty acid ester of polyglycerin is within the above-mentioned range, the present composition can provide an article with higher utility oil resistance, and when it is not lower than the above-mentioned lower limit, the emulsion shows good dispersion stability.

The amount of additional surfactants in the emulsion is preferably at most 6 parts by mass, more preferably at most 3 parts by mass, per 100 parts by mass of the monomer component When the amount of additional surfactants is not higher than the above-mentioned upper limit, it is possible to reduce the adverse effect of additional surfactants on the water and oil resistance of an article treated with the present composition.

The content of additional surfactants may be 0 part by mass.

The dispersion of the polymer A obtained by polymerizing a monomer component in an emulsion may be used as the present composition, by itself or after diluted with an aqueous medium to a certain solid content. Additional components may be added to the present composition.

The conversion rate of the monomer component to the polymer A at completion of the polymerization is preferably at least 80%, more preferably at least 90%. As the conversion rate increases, the molecular weight of the polymer A increases, and the present composition can provide water- and oil-proof paper with higher water and oil resistance. Because a high conversion rate leads to less damage to polymer performance by remaining monomers and a higher fluorine content of the polymer A, the present composition can impart high water and oil resistance.

It is preferred to optimize the composition of the emulsion and the polymerization time so that a conversion rate of 80% or higher is achieved.

The present composition is used for treatment of various substrates or production of water- and oil-proof paper, as described later.

(Mechanism)

Because a monomer composition comprising a monomer (a) is polymerized in the method of the present invention described above, the method can produce a water- and oil-proofing composition which can provide water- and oil-proof paper with alkali-resistant water and oil resistance.

Because the monomer composition is polymerized in an emulsion in the method of the present invention, the polymer A is produced with a high molecular weight, and hence, the method can produce a water- and oil-proofing composition which can provide water- and oil-proof paper with high water and oil resistance.

Because the emulsion in the method of the present invention comprises a fatty acid ester of polyglycerin, the method can produce a water- and oil-proofing composition which can provide an article with high utility oil resistance.

However, the method for producing the present composition is not limited to the above-mentioned method. For example, the present composition may be produced by polymerizing the monomer component to obtain a polymer A and mixing the polymer A with a fatty acid ester of polyglycerin and an aqueous medium. In such a case, the polymer A can be obtained by a conventional polymerization method such as emulsion polymerization, solution polymerization or bulk polymerization.

[Article]

The article of the present invention is obtained by treating a substrate with the present composition. A water and oil resistant article is obtained by treating a substrate with the present composition.

The substrate may, for example, be a paper substrate (paper, paperboard, molded pulp, synthetic paper containing synthetic fiber as an ingredient and related material), a cellulose-based or regenerated-cellulose-based woven or non-woven fabric, a natural or semisynthetic fiber-based woven or non-woven fabric (such as cotton, cellulose acetate, wool or silk), a synthetic fiber-based woven or non-woven fabric (such as polyamide fiber, polyester fiber, polyolefin fiber, polyurethan fiber, polyacrylonitrile fiber), leather, synthetic leather, a resin, a plastic material such as film, glass, wood, a metal, concrete, stone, a tile, ceramics, a brick or a surface coating.

The treatment method may, for example, comprise coating or impregnating a substrate with the present composition and then drying the substrate at 60° C. or above, if necessary, followed by heating. Drying and heating enable the present composition to impart higher water and oil resistance to the substrate.

As the article, water- and oil-proof paper or water- and oil-proof molded pulp is preferred as the present composition is suitable for treatment of a paper substrate.

The article of the present invention is obtained by treatment with the present composition and hence has good utility oil resistance.

[Water- and Oil-Proof Paper]

The water- and oil-proof paper of the present invention is obtained by treating a pulp or paper with the present composition.

The water- and oil-proof paper may be produced by coating or impregnating a paper substrate with the present composition (external addition process) or by forming a pulp slurry comprising the present composition into a paper sheet (internal addition process).

The present composition may be diluted with water or an aqueous medium before use in the external addition process and the internal addition process. The solid content of the present composition to be used for production of water- and oil-proof paper is preferably from 10 to 30 mass %, more preferably from 20 to 25 mass %.

(External Addition Process)

The paper substrate may, for example, be produced by beating a pulp slurry in water, if necessary mixing two or more pulp slurries in a certain ratio, adding some agents, and forming the slurry into a sheet on a wire screen. The paper substrate may be in the form of a continuous long web, in the form of a sheet cut from such a web, or in the form of molded pulp (such as a container) produced by a pulp molding machine. The basis weight of the paper substrate is, for example, from 10 g/m² to 500 g/m².

As examples of the source of pulp, wood such as coniferous wood and deciduous wood, grass plants such as bagasse, rice straw, bamboo, reed and coconut shell, and waste paper may specifically be mentioned. Pulp from wood and grass plants is called fresh pulp, while pulp from waste paper is called recycled pulp.

Fresh pulp comes in different names depending on the method of production, such as kraft pulp (KP), sulfite pulp (SP), soda pulp, mechanical pulp (MP), thermomechanical pulp (TMP) and chemithermomechanical pulp (CTMP). Fresh pulp may be bleached through one or more bleaching steps, if necessary.

Recycled pulp may be produced by disintegration, cleaning, deinking or bleaching or by a combination thereof, if necessary.

The paper substrate may contain a sizing agent, a fixing agent, a dry-strength additive, a wet-strength additive, aluminum sulfate, a retention aid, a dye, a pigment, a filler or the like, as long as they do not spoil the effect of the present invention.

The present composition may comprise other paper additives.

As such additives to be used in the external addition process, a paper strength additive (such as starches and resins), a sizing agent, a penetrant, a defoamer, a chelating agent, a dye, a pigment, a binder, an acid, an alkali, an alginate and aluminum sulfate may, for example, be mentioned.

The present composition may be applied by coating or impregnation at any stage after sheet forming, at the size press after sheet forming, a wet press and a pre-dryer, or at a coater after the size press.

The present composition may be applied using a coating machine.

As a coating machine, a size press machine, a coater or a printing machine or the like may be mentioned.

As a size press machine, a two-roll size press machine, a film transfer size press machine, a calender size press machine or the like may be mentioned.

As a coater, a roll coater, an air knife coater, a die coater, a blade coater, a bar coater, a bill blade coater, a short dwell blade coater or the like may be mentioned.

As a printing machine, a gravure printing machine, a flexographic printing machine, an offset printing machine or the like may be mentioned.

After coating or impregnation with the present composition, the paper substrate is dried. The drying may be carried out by heating or without heating (air drying).

The drying temperature is preferably from 20 to 300° C., more preferably from 20 to 250° C.

(Internal Addition Process)

The pulp slurry is a dispersion of pulp in water.

The pulp is obtained from a similar source to those mentioned previously for external addition process. The pulp slurry may be produced disintegrating dry pulp in a disintegrator, or by diluting wet pulp produced by a pulper. A single pulp slurry may be used alone, or two or more pulp slurries may be used after mixed in a certain ratio.

The concentration of pulp in the pulp slurry is preferably from 0.1 to 10 mass %.

The present composition may be added at any stage before supplying the pulp slurry onto the wire screen in a paper machine.

To the pulp slurry, paper additives may also be added. As such additives to be internal addition process, a coagulant, a retention aid, a sizing agent, a paper strength additive, a pigment, a dye and a pH adjuster may, for example be mentioned.

For forming the pulp slurry into a sheet, a paper machine may be used. The paper machine may be any device designed to drain water from the pulp slurry on a wire screen. The paper machine may be a continuous paper machine such as a Fourdrinier paper machine, a batch type pulp molding machine which drains water from a pulp slurry through a wire screen mold to produce a molded product.

The water- and oil-proof paper of the present invention has high utility oil resistance because it is made of a pulp or paper treated with the present composition.

EXAMPLES

Now, the present invention will be described in further detail with reference to Examples. However, it should be understood that the present invention is by no means restricted thereto. Room temperature means 25° C.±5° C. "Parts" means "parts by mass".

Examples 1 to 8 are Examples of the present invention, and Example 9 to 14 are Comparative Examples.

(Solid Content)

A sample (a fluorinated polymer dispersion) obtained as described later in the Examples was heated at 120° C. in a suction oven (a convection dryer) for 4 hours. The (actual) solid content (mass %) was calculated by dividing the mass of the solid obtained after the heating (solid mass) by the mass of the sample before the heating.

The (theoretical) solid content was calculated from the concentration and feed amounts of raw materials used in the Examples.

(Composition of Fluorinated Polymer)

The composition of a fluorinated polymer (the ratio of each kind of units to all the units constituting the fluorinated polymer) (mol %) was calculated from the feed amount of each monomer.

(Molecular Weight)

<Recovery of Fluorinated Polymer>6 g of a fluorinated polymer dispersion obtained in each Example was added dropwise to 60 g of a mixture of 6 g of hexane and 54 g of 2-butanol under stirring to precipitate a solid. The mixture was centrifuged at 3,000 rpm for 5 minutes, and the solid pellet was separated, then stirred well with 30 g of alcohol denatured with isopropyl alcohol (product name: 95% alcohol denatured with IPA, manufactured by Imazu Chemical Co., Ltd.) and 30 g of ion-exchanged water, and centrifuged at 3,000 rpm for 5 minutes. The solid pellet was separated from the supernatant and dried in a vacuum at 35° C. over night to recover the fluorinated polymer.

<Measurement of Mn>

The recovered fluorinated polymer was dissolved in a mixed medium comprising a fluorine-containing medium (AK-225, manufactured by AGC Inc.)/THF in a volume ratio of 6/4 to make a solution with a solid content of 0.5 mass %, and the solution was passed through a 0.2-μm filter to prepare an analytical sample. The number-average molecular weight (Mn) was measured by GPC of the analytical sample under the following conditions.

Instrument: HLC-8320 GPC manufactured by Tosoh Corporation,

Column: MIXED-C manufactured by Polymer laboratories, having a length of 300 mm, an inner diameter of 7.5 mm and a wall thickness of 5 μm, Mobile phase: mixed medium comprising AK-225/THF=6/4 (volume ratio), Flow rate: 1.0 mL/min, Oven temperature: 37° C., Sample concentration: 1.0 mass %, Injection volume: 50 μL, Detector: RI (refractive index detector) and Standard sample: polymethyl methacrylate (Mn=2,136,000, 955,000, 569,000, 332,800, 121,600, 67,400, 31,110, 13,300, 7,360, 1,950, 1,010, and 550).

(Oil Resistance: TAPPI KIT)

Test paper was tested for oil resistance by the following method (the kit test) in accordance with TAPPI KIT-559cm-02, using test solutions (kit reagents) prepared by mixing castor oil, toluene and heptane in the ratios (vol %) shown in Table 1.

Test paper was laid on a flat, clean and black plane, and one droplet of each test solution, in order of decreasing kit number, was dropped from a height of 13 mm onto the test paper. After 15 seconds, the droplet of the test solution was removed with clean blotting paper, and the surface of the area of the test paper which had been in contact with the test solution was examined with the naked eye. The kit number of the highest numbered test solution that left no stain on the paper was used as the rating for the oil resistance of the paper. A higher number implies better oil resistance. A rating of 4 or greater was judged as ○ (acceptable).

TABLE 1

| No. | Castor oil | Toluene | n-Heptane |
|---|---|---|---|
| 1 | 100 | 0 | 0 |
| 2 | 90 | 5 | 5 |

TABLE 1-continued

| No. | Castor oil | Toluene | n-Heptane |
|---|---|---|---|
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 50 | 50 |
| 12 | 0 | 45 | 55 |

(Water Resistance: Stockigt Size)

The stockigt sizing degree (second) of treated paper was measured in accordance with JIS P8122: 2004. A high sizing degree indicates higher water resistance. A sizing degree of at least 7 seconds was judged as ○ (acceptable).

(Service Oil Resistance: Soybean Oil Test)

Test paper was cut into 5 cm×5 cm, folded in four and then laid unfolded on a flat table. About 0.5 mL of soybean oil was dropped onto the test paper, and the test paper was kept in an environmental test chamber at 60° C. for 1 hour or 2 hours. After it was taken out of the environmental test chamber, the soybean oil was blotted from the test paper, and the test paper was examined with the naked eye for penetration of soybean oil and rated on the 6-point scale shown in Table 2. The greater the rating, the better utility oil resistance. This test uses a common edible plant oil to evaluate oil resistance under conditions of practical use.

TABLE 2

| No. | Penetration |
|---|---|
| 0 | A stain spreading the entire surface of the test paper. |
| 1 | A stain spreading half or more of the surface of the test paper. |
| 2 | A stain in the same shape as the contact area between the oil and the test paper |
| 3 | A patchy stain |
| 4 | A tiny stain |
| 5 | No stains |

The following raw materials were used in the Examples described below.

(Monomer (a))

C6OLF: $CH_2=CH-(CF_2)_5CF_3$ (manufactured by Tokyo Chemical Industry Co., Ltd.)

(Monomer (b))

VAC: vinyl acetate (manufactured by Tokyo Chemical Industry Co., Ltd.)

VP: vinyl pivalate (manufactured by Tokyo Chemical Industry Co., Ltd.)

NVP: N-vinyl-2-pyrrolidone (Fatty Acid Ester of Polyglycerin)

D1-50SV: decaglyceryl monostearate (manufactured by Nikko Chemicals Co., Ltd., under the product name NIKKOL Decaglyn 1-50SV, HLB value 15)

D1-L: decaglyceryl monolaurate (manufactured by Nikko Chemicals Co., Ltd., under the product name NIKKOL Decaglyn 1-L, HLB value 15.5)

(Additional Surfactants)

E430: 10 mass % aqueous solution of polyoxyethylene oleyl ether (adduct with about 30 moles of ethylene oxide, manufactured by Kao Corporation under the product name EMULGEN 430)

P204: ethylene oxide-propylene oxide polymer (containing 40 mass % of oxyethylene groups, and having an average molecular weight of 3,300, manufactured by NOF Corporation under the product name of Pronon #204)

SFY420: 10 mass % solution of acetylene glycol ethylene oxide adduct in dipropylene glycol (with 1.3 moles of ethylene oxide, manufactured by Nisshin Chemical Co., Ltd., under the product name SURFYNOL 420)

<Cationic Surfactants>

LQ1863: 63 mass % solution of monostearyltrimethylammonium chloride in water and isopropyl alcohol (manufactured by of Lion Specialty Chemicals Co., Ltd., under the product name LIPOQUAD 18-63)

(Media)

Water: ion-exchanged water

DPG: dipropylene glycol (Polymerization Initiator)

VA-061A: 20 mass % aqueous solution of acetate of 2,2'-azobis[2-(2-imidazolin yl)propane] (manufactured by FUJIFILM Wako Pure Chemical Corporation, under the product name VA-061) (VA-061:acetic acid=1:0.8 (mass ratio))

Example 1

<Preparation of Fluorinated Polymer Dispersion>

In a 30 mL vial, 66.7 parts of C6OLF, 33.3 parts of VAC, 3.0 parts of D1-50SV, 82.5 parts of water and 17.5 parts of DPG were put to obtain a liquid mixture. The liquid mixture was stirred by means of a homogenizer to obtain an emulsion. The emulsion was entirely transferred to an ampoule, and 5.0 parts of VA061A was added. The gas phase in the ampoule was replaced by nitrogen, and polymerization was carried out at 45° C. for 72 hours to obtain a fluorinated polymer dispersion. The solid content of the fluorinated polymer dispersion obtained, and the composition and Mw of the fluorinated polymer are shown in Table 3.

<Preparation of Test Paper 1 (External Addition)>

The fluorinated polymer dispersion obtained was diluted with water to obtain a treating solution with a solid content of about 2 mass %.

The treating solution was applied to bleached non-sized paper having a basis weight of 40 g/m$^2$ by means of a size press and dried at 105° C. for 60 seconds in such an amount that the fluorinated polymer content per unit area of the test paper was about 0.2 g/m$^2$ or 0.6 g/m$^2$, to obtain a test paper (water- and oil-proof paper). The results of evaluation of the test paper are shown in Table 3.

Example 2

<Preparation of Test Paper 2 (Internal Addition)>

A pulp comprising bleached hardwood kraft pulp (LBKP) and bleached softwood kraft pulp (NBKP) in a mass ratio (LBKP/NBKP) of 5/5 with a freeness of 550 mL c.s.f was dispersed in water to a solid content of 1.0 mass %, and the fluorinated polymer dispersion prepared in Example 1 was added to obtain a paper furnish. The paper furnish was formed into a sheet that would have a dry basis weight of about 80 g/cm$^3$ and dried on a drum dryer at 100° C. for 60 seconds to obtain a test paper. c.s.f stands for Canadian Standard Freeness.

The fluorinated polymer dispersion was added so that the mass of the fluorinated polymer per unit area of the resulting test paper would be about 80 g/m$^2$, and the mass of the fluorinated polymer relative to the dry mass of the pulp would be about 0.3 mass %. The results of evaluation of the resulting test paper are shown in Table 5.

Examples 3 to 14

Fluorinated polymer dispersions were obtained in the same manner as in Example 1 except that the raw materials shown in Tables 3 to 4 were used, and test papers were prepared. The solid contents of the fluorinated polymer dispersions obtained, the compositions and Mw's of the fluorinated polymers, and the results of evaluation of the test papers are shown in Tables 3 to 4.

TABLE 3

| | | | Ex. 1 | Ex. 3 | Ex. 4 | Ex. 5 | Ex. 6 | Ex. 7 | Ex. 8 |
|---|---|---|---|---|---|---|---|---|---|
| Ingredients (parts) | Monomer component | C6OLF | 66.7 | 66.7 | 66.7 | 66.7 | 66.7 | 50.0 | 65.0 |
| | | VAC | 33.3 | 33.3 | 33.3 | 33.3 | 33.3 | 50.0 | 30.0 |
| | | VP | — | — | — | — | — | — | 3.5 |
| | | NVP | — | — | — | — | — | — | 1.5 |
| | Media | Water | 82.5 | 84.0 | 85.5 | 87.0 | 85.5 | 85.5 | 95.3 |
| | | DPG | 17.5 | 17.5 | 17.5 | 17.5 | 17.5 | 17.5 | 17.0 |
| | Fatty acid ester of polyglycerin | D1-50SV | 3.0 | 4.5 | 6.0 | 7.5 | — | 6.0 | 6.0 |
| | | D1-L | — | — | — | — | 6.0 | — | — |
| | Additional surfactants | E430 | — | — | — | — | — | — | — |
| | | P204 | — | — | — | — | — | — | — |
| | | SFY420 | — | — | — | — | — | — | — |
| | | LQ1863 | — | — | — | — | — | — | — |
| | Initiator | VA-061A | 5.0 | 5.0 | 5.0 | 5.0 | 5.0 | 5.0 | 5.0 |
| Fluorinated polymer | Composition (mol %) | C6OLF | 33.0 | 33.0 | 33.0 | 33.0 | 33.0 | 20.0 | 33.0 |
| | | VAC | 67.0 | 67.0 | 67.0 | 67.0 | 67.0 | 80.0 | 60.0 |
| | | VP | — | — | — | — | — | — | 5.0 |
| | | NVP | — | — | — | — | — | — | 2.0 |
| | Mn | [—] | 20000 | 22000 | 18000 | 24000 | 18000 | 22000 | 24000 |
| Dispersion | Solid conent (theoretical) | [%] | 50 | 50 | 50 | 50 | 50 | 50 | 50 |
| | Solid conent (actual) | [%] | 47 | 46 | 49 | 47 | 47 | 46 | 48 |
| TAPPIKIT | External addition 0.6 g/m$^2$ | [—] | ○ | ○ | ○ | ○ | ○ | ○ | ○ |
| Stockigt size | External addition 0.6 g/m$^2$ | [—] | ○ | ○ | ○ | ○ | ○ | ○ | ○ |
| Utility oil resistance | External addition 0.6 g/m$^2$ | 1 h | 4 | 4 | 4 | 4 | 4 | 4 | 4 |
| | External addition 0.2 g/m$^2$ | 1 h | 2.5 | 3 | 3 | 2.5 | — | 2.5 | — |
| | | 2 h | 2 | 3 | 3 | 2 | — | 2.5 | — |

TABLE 4

|  |  |  | Ex. 9 | Ex. 10 | Ex. 11 | Ex. 12 | Ex. 13 | Ex. 14 |
|---|---|---|---|---|---|---|---|---|
| Ingredients (parts) | Monomer component | C6OLF | 66.7 | 66.7 | 66.7 | 66.7 | 65.0 | 66.7 |
|  |  | VAC | 33.3 | 33.3 | 33.3 | 33.3 | 30.0 | 33.3 |
|  |  | VP | — | — | — | — | 3.5 | — |
|  |  | NVP | — | — | — | — | 1.5 | — |
|  | Media | Water | 72.0 | 63.0 | 49.5 | 42.0 | 78.2 | 72.7 |
|  |  | DPG | 17.5 | 17.5 | 17.5 | 17.5 | 15.2 | 17.4 |
|  | Fatty acid ester of polyglycerin | D1-50SV | — | — | — | — | — | — |
|  |  | D1-L | — | — | — | — | — | — |
|  | Additional surfactants | E430 | 10.0 | 20.0 | 40.0 | 50.0 | 19.0 | 10.0 |
|  |  | P204 | 0.5 | 1.0 | 2.0 | 2.5 | 1.0 | 0.5 |
|  |  | SFY420 | — | — | — | — | 2.0 | — |
|  |  | LQ1863 | — | — | — | — | — | 0.3 |
|  | Initiator | VA-061A | 5.0 | 5.0 | 5.0 | 5.0 | 5.0 | 5.0 |
| Fluorinated polymer | Composition (mol %) | C6OLF | 33.0 | 33.0 | 33.0 | 33.0 | 33.0 | 33.0 |
|  |  | VAC | 67.0 | 67.0 | 67.0 | 67.0 | 60.0 | 67.0 |
|  |  | VP | — | — | — | — | 5.0 | — |
|  |  | NVP | — | — | — | — | 2.0 | — |
|  | Mn | [—] | 22000 | 24000 | 23000 | 20000 | 19000 | 25000 |
| Dispersion | Solid conent (theoretical) | [%] | 50 | 50 | 50 | 50 | 47 | 50 |
|  | Solid conent (actual) | [%] | 47 | 44 | 47 | 45 | 42 | 47 |
| TAPPIKIT | External addition 0.6 g/m² | [—] | ○ | ○ | ○ | ○ | ○ | ○ |
| Stockigt size | External addition 0.6 g/m² | [—] | ○ | ○ | ○ | ○ | ○ | ○ |
| Utility oil resistance | External addition 0.6 g/m² | 1 h | 3 | 3 | 2.5 | 3 | 2.5 | 3 |
|  | External addition 0.2 g/m² | 1 h | 2 | 2 | 2 | 2 | 2 | 2 |
|  |  | 2 h | 1 | 1 | 1 | 1 | 1 | 0 |

TABLE 5

|  |  |  | Ex. 2 |
|---|---|---|---|
| Ingredients (parts) | Monomer component | C6OLF | 66.7 |
|  |  | VAC | 33.3 |
|  |  | VP | — |
|  |  | NVP | — |
|  | Media | Water | 82.5 |
|  |  | DPG | 17.5 |
|  | Fatty acid ester of polyglycerin | D1-50SV | 3.0 |
|  |  | D1-L | — |
|  | Additional surfactants | E430 | — |
|  |  | P204 | — |
|  |  | SFY420 | — |
|  |  | LQ1863 | — |
|  | Initiator | VA-061A | 5.0 |
| TAPPIKIT |  | [—] | ○ |
| Stockigt size |  | [—] | ○ |
| Utility oil resistance |  | 1 h | 5 |

The test papers obtained by using the fluorinated polymer dispersions of Examples 1 to 8 showed good utility oil resistance and good water resistance.

In contrast, the test papers obtained by using the fluorinated polymer dispersions of Examples 9 to 14 containing additional surfactants instead of a fatty acid ester of polyglycerin showed good oil resistance in the kit test but showed poor utility oil resistance.

INDUSTRIAL APPLICABILITY

The water- and oil-proofing composition of the present invention is useful as a water- and oil-proofing agent for paper, a surface treatment for glass, resin products and the like, a water and oil repellent, an antifouling agent, a release agent and the like.

Water- and oil-proof paper obtained by using the water- and oil-proofing composition of the present invention is useful as food packaging, food wrapping, an antifouling sheet and the like.

This application is a continuation of PCT Application No. PCT/JP2021/018860, filed on May 18, 2021, which is based upon and claims the benefit of priority from Japanese Patent Application No. 2020-088235 filed on May 20, 2020. The contents of those applications are incorporated herein by reference in their entireties.

What is claimed is:

1. A water- and oil-proofing composition, comprising:
an aqueous medium;
a fluorinated polymer comprising units based on a monomer of formula (1), $CH_2=CH-R^f$, where $R^f$ is a $C_{1-8}$ perfluoroalkyl group, and units based on a monomer copolymerizable with the monomer of the formula (1); and
a fatty acid ester of polyglycerin having a content in a range of 2 to 8 parts by mass per 100 parts by mass of the fluorinated polymer.

2. The water- and oil-proofing composition according to claim 1, wherein the fatty acid ester of polyglycerin has an HLB in a range of 10 to 18.

3. The water- and oil-proofing composition according to claim 1, wherein a ratio of units based on the monomer of the formula (1) to all the units forming the fluorinated polymer is in a range of 15 to 40 mol %.

4. The water- and oil-proofing composition according to claim 1, wherein the monomer copolymerizable with the monomer of the formula (1) comprises a compound of formula (2), $CH_2=CH-Q$, or formula (3), $CH_2=CHCH_2-Q$, and having a molecular weight in a range of 45 to 350, where Q is a halogen atom or an organic group having an oxygen atom, a nitrogen atom or a sulfur atom at a bonding end.

5. The water- and oil-proofing composition according to claim 4, wherein Q in the formula (2) and the formula (3) is a fluorine atom, a chlorine atom, $-OR^4$, $-OC(=O)R^4$, $-NHR^4$, $-NR^4R^5$, $-SR^4$ or a nitrogen-containing heterocyclic group having a ring-constituting nitrogen atom at the bonding end, where (each of $R^4$ and $R^5$ is independently a $C_{1-22}$ alkyl group, a cycloalkyl group having from 3 to 8 ring-constituting carbon atoms, an aryl group, or a heterocyclic group).

6. The water- and oil-proofing composition according to claim 4, wherein the monomer comprising the compound of the formula (2) or the formula (3) is at least one selected from the group consisting of a vinyl carboxylate, an allyl carboxylate, an alkyl vinyl ether, an alkyl allyl ether, a hydroxyalkyl vinyl ether, a hydroxyalkyl allyl ether, a vinyl halide, and an allyl halide.

7. The water- and oil-proofing composition according to claim 4, wherein a ratio of units based on the monomer comprising the compound of the formula (2) or the formula (3) to all the units forming the fluorinated polymer is in a range of 60 to 85 mol %.

8. The water- and oil-proofing composition according to claim 1, wherein $R^f$ in the formula (1) is a $C_{1-6}$ perfluoroalkyl group.

9. A method for producing a water- and oil-proofing composition, comprising:
 polymerizing a monomer component in an emulsion comprising the monomer component, a fatty acid ester of polyglycerin, an aqueous medium and a polymerization initiator,
 wherein the monomer component comprises a monomer of formula (1) and a monomer copolymerizable with the monomer of the formula (1), $CH_2=CH-R^f$, where $R^f$ is a $C_{1-8}$ perfluoroalkyl group, wherein the fatty acid ester of polyglycerin has a content in a range of 2 to 8 parts by mass per 100 parts by mass of the monomer component.

10. The method for producing a water- and oil-proofing composition according to claim 9, wherein a ratio of the monomer of the formula (1) to the monomer component is in a range of 15 to 40 mol %.

11. A treated article obtained by a process including treating an article with the water- and oil-proofing composition of claim 1.

12. A water- and oil-proof paper obtained by a process including treating a pulp or paper with the water- and oil-proofing composition of claim 1.

13. The water- and oil-proofing composition according to claim 1, wherein the fluorinated polymer has a number-average molecular weight of at least 10,000.

14. The water- and oil-proofing composition according to claim 1, wherein the fluorinated polymer has a number-average molecular weight in a range of 10,000 to 50,000.

* * * * *